United States Patent [19]

Banks

[11] 4,440,369
[45] Apr. 3, 1984

[54] PIPE HANGER

[76] Inventor: James C. Banks, 1401 N. Shawano Dr., Marshfield, Wis. 54449

[21] Appl. No.: 357,139

[22] Filed: Mar. 11, 1982

[51] Int. Cl.³ .............................................. F16L 3/00
[52] U.S. Cl. ...................................................... 248/62
[58] Field of Search .................. 248/62, 60, 67.7, 59, 248/327, 610, 71, 317

[56] References Cited

U.S. PATENT DOCUMENTS

| | | | |
|---|---|---|---|
| 2,923,509 | 2/1960 | Kolodin | 248/62 |
| 3,171,624 | 3/1965 | Leahy | 248/62 |
| 3,603,538 | 9/1971 | Vitas | 248/59 |
| 3,652,045 | 3/1972 | Hirt | 248/62 |
| 4,166,600 | 9/1979 | Perses | 248/62 |

Primary Examiner—William H. Schultz
Assistant Examiner—Ramon O. Ramirez
Attorney, Agent, or Firm—B. Kreten

[57] ABSTRACT

A pipe hanger for use in attaching pipe to a depending hanger rod preferably within an industrial environment which includes a first member having outwardly extending hook ends and fixed to the depending hanger rod, and a second member having an arcuate lower portion and substantially linear top portion terminating in a upper area having looped ends each looped end adapted to overlie one hooked end of the first member.

4 Claims, 3 Drawing Figures

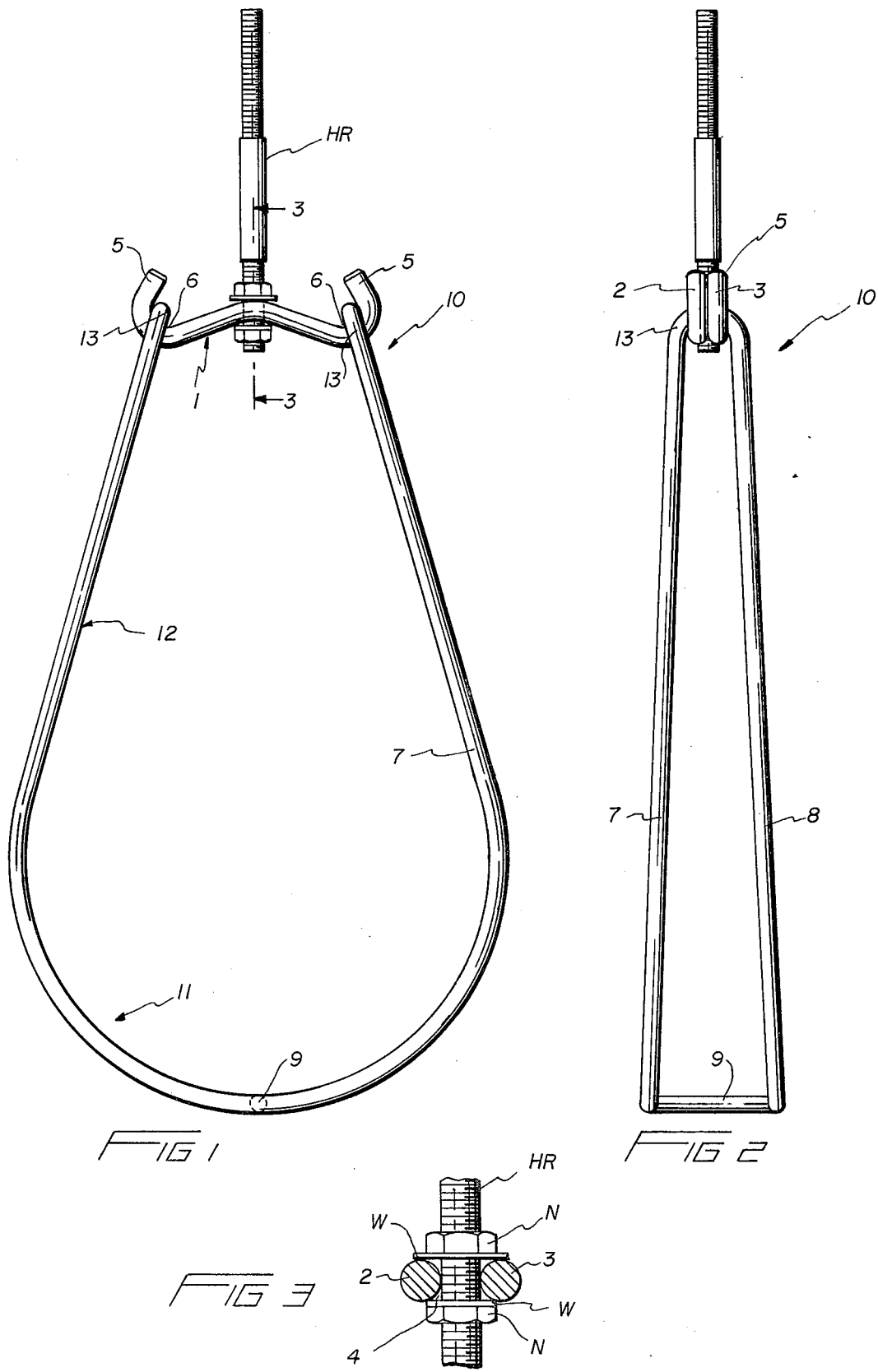

PIPE HANGER

BACKGROUND OF THE INVENTION

The following invention relates generally to hangers for supporting pipes in depending relationship from an overhead support structure having a interconnecting depending hanger rod.

More specifically, it is within the purview of the instant application to provide a hanger especially fabricated for industries such as pulp and paper plants, breweries, cheese plants, food processors, milk processors and pharmaceutical manufactures which are specifically designed to support steel, stainless steel, FRP, polyethylene, PVC and other similar piping materials. Formed from stainless steel, the hanger according to the instant invention is resistant to chemical attack in corrosive environments, and can be characterized in its intrinsic simplicity and ease in installation. Devices which are adapted to be secured in depending relation from a ceiling, joist, or other warehouse type of overhead support have been limited in their ability to quickly and easily releasably fasten the supporting hanger so that dissociation relative to a pipe can be quickly effected. In previously known types of hanger structures, devices have been provided which are fixed constrained to supporting beams of an overhead layer. These known prior art devices appear to be capable of classification in two general areas: those which have hanger extremities provided with sharpened pointed ends adapted to penetrate within joists, rafters, or the like made of wood or some other material capable of penetration, and those which coact with threaded rods suspended from other members on the ceiling.

The know prior art devices of the first type include the following patents: Kirk et al. U.S. Pat. No. 2,641,428; Benno U.S. Pat. No. 3,554,475 and Jones U.S. Pat. No. 4,266,745; those of the second type Habuda U.S. Pat. No. 4,019,705, Krahe U.S. Pat. No. 3,687,406.

The Kirk et al. patent allows free movement of the pipe by virtue of the disposition of a pair of supporting rollers 18, 19. Since this device has pointed ends 9, adapted to be received within joists or beams B, it is clear that the rollers are required so as to minimize the tendency of pipes which are actually disposed thereon from working the hanger loose during placement. This is considered to be an additional unnecessary cost feature, and the device according to the instant application is distinguished thereover by the provision of first and second members relatively detachable the first member fixedly supported by a hanging rod, the second member having rounded load bearing surfaces which while providing less friction in combination with the overall supporting mechanism can withstand deflections on installation without compromising the ability of the hanger to perform its supporting function. The hanger rod according to the instant application is not in and of itself an important design criteria for the instant application, other than it should be of adequate strength to support the overall weight of the system. Rather, the hanger rod should be suitably formed to accommodate the first member so that the first member in turn can support the second member as set forth hereinafter.

Similarly, the patent to Benno describes a known device which can be used either as a pipe stand or for hanging pipes. Thus, to perform adequately these duals roles, the resultant structure is comparatively more cumbersome and it is estimated would triple the cost of installing pipe as opposed to the apparatus according to the instant application. This hanger according to Benno also allows free movement of the pipe, and is constrained by means of plates 15 which are secured to a beam or ceiling.

Similarly, the patent to Jones diplays a known device in which a pipe hanger has a strap which underlies the pipe to be supported, and first and second pointed ends are provided adapted to be driven into wood or other structural members. The pointed ends can be rotated to engage the wood at different angles if necessary. Clearly therefore, this hanger is limited to be used with a wooden member which requires considerable adjustment and assemblage on a job site lending itself mainly for use in residental buildings and is not fashioned to be readily deployed in a commercial environment.

The patent to Habuda et al. teaches the use of a pipe hanging apparatus in which a threaded stud is disposed in depending relationship on a supporting surface, typically an I-beam fastened thereto my means of a thumbscrew type of clamp. Free ends of the hanger are required to be aligned in a specific fashion, which makes the on-job disposition of the hanging apparatus somewhat more cumbersome than the apparatus according to the instant application. The clamping mechanism is a relatively expensive mechanism whose use is restricted in attaching to a structural member such as an I-beam.

The patent to Krahe et al. is another prior art known device of the second type which allows free movement of the pipe and is adapted to support plural pipes which would provide complications especially if the pipes were of different diameters. Coupled with the threaded ends 9 as the job requires are suitably formed supporting openings which are difficult to align and, this device would not lend itself readily to rapid application as does the instant application.

By way of contrast, the instant application is directed to and provides a novel apparatus in which a pipe hanger is supported by a depending stud of a hanger rod, the hanger having a first member which is threaded upon the depending stud, the first member having laterally extending hook ends which freely emanate from the stud. The pipe hanger's second member is formed from an arcuate strap having linear portions extending upwardly towards and adapted to loop over the hooked ends of the first member, the second member being sufficiently resilient that an orienting deformation can occur with a minimal amount of effort. Thus, the first member forming the pipe hanger can be firmly attached to the depending stud without the limitations of supporting a pipe or threadedly engaging same, and thereafter the pipe can be easily supported and affixed to the first member by positioning the arcuate strap thereunder and hooking one end on the first member, and bending another terminal portion of the arcuate strap over a second hooked end for firmly affixing the members together.

SUMMARY AND OBJECTS OF THE INVENTION

Accordingly, this invention has as an objective to provide a pipe hanger which is suitably fashioned to be rapidly deployed in a commercial environment.

It is yet a further object of this invention to provide a device with the character described above in which the pipe hanger is formed from two members, a first member adapted to be hung from a hanging rod when no load is being disposed thereon, thereby lending itself to a facile assembly, and a second member having an arcuate portion, while a first free end of the arcuate portion is adapted to be placed over a hook provided on the first member, a second free end readily deformable by the virtue of the resiliency of the hanger to engage a second hook.

It is yet a further object of this invention to provide a device of the character described above which is extremely durable in construction, and fabricated from a material impervious to corrosive elements in industrial environments.

It is still yet a further object of this invention to provide a device of the character described above which is extremely safe to use, and lends itself to mass production techniques.

It is still yet a further object of this invention to provide a device of the character described above which can be readily disassembled should it so be so desired, thereby providing a commercial installation in which updates in technology and reorganization of various pieces of equipment associated with the commercial process can be effected in a minimal amount of time by having the pipes supported by the hangers so readily removably fixed in place that renovations are readily feasible.

These and other objects will be made manifest when considering the following detailed specification when taken in conjuction with the appended drawing figures in which there has been provided a pipe hanger which is adapted to be attached to a depending hanger rod, the hanger rod supported by any suitable known means from the ceiling of the building or the like of preferably a commercial establishment, the pipe hanger having a first member including outwardly extending hook ends which are initially fixed to the hanger rod when devoid of any pipe supporting load, and a second member having a lower portion of arcuate shape and a top portion with means to removably attach the second member to the hook ends of the first member for rapid deployment to the hanger rod, wherein the arcuate lower portion supports the pipe thereon.

BRIEF DESCRIPTION OF THE DRAWING FIGURES

FIG. 1 is a front view of the pipe hanger according to the present invention.

FIG. 2 is a side view of that which is shown in FIG. 1.

FIG. 3 is a sectional view taken along lines 3—3 of FIG. 1, showing the fastening details of the hanger rod to the first member.

BRIEF DESCRIPTION OF THE PREFERRED EMBODIMENT

Referring to the drawings now, wherein like reference numerals refer to like parts throughout the various drawing figures, reference numeral 10 is directed to the pipe hanger according to the present invention.

The pipe hanger is preferably formed of a metal that is impervious to corrosive environments commonly found in many types of industries, and may be in one form fabricated as stainless steel, plastic or the like. In addition, it is contemplated that the pipe hanger 10 has sufficient resiliency and memory whereby deformation of the hanger will provide a spring tension thereon which as long as the tension remains within the materials elastic limits will cause and encourage the pipe hanger to return to its original configuration, and when suitably deployed will be sufficiently tensioned so as to be reliably secured.

The hanger 10 as shown in FIGS. 1 and 2, depends from a known hanger rod HR, the hanger rod having a lowermost terminus provided with a plurality of threads. FIG. 3 shows that the first member 1 is formed from two rods 2, 3 having lateral extremities provided with hooks 5 that extend upwardly and inwardly towards the hanger rod, and a bight portion 6 for reception therein of the looped ends 13 of the second member to be described hereinafter. The central portion of the first member 1 includes a central opening 4 to allow slidable disposition over the threaded terminus of the hanging rod HR. A stop nut N is provided on the hanging rod HR and an underlying washer abuts against the two rods 2 and 3; in supporting relationship, a further washer W underlies the rods 2 and 3 about the opening 4, and a securing nut N is disposed upon the lowermost portion of the threaded terminus of the hanger rod HR. Thus, the horizontal elevation of the first member 1 can be varied within the limits of the extent of the threaded portion of the hanger rod HR. Once so affixed, however, it is reliably fastened thereto. As shown in FIGS. 1-3, the central portion of the first member has central opening 4, and the laterally extending rods 2, 3, bend downwardly and curve upwardly at the bight portion 6, to provide the hook ends 5. The two wire rods 2, 3, are preferably joined together intermediate the hooked ends 5 and the open area 4 by means of welding or the like.

A second member is provided having an arcuate lower section 11 as shown in FIG. 1, the arcuate section defining a constant radius curvature, and a linear upper portion 12 extending inwardly and upwardly towards the first member 1. As shown in FIG. 2, the uppermost portion of the second member terminates in open looped ends 13 by the confluence of first and second rods 7 and 8 of the second member. As shown in FIG. 2, a side view reveals that the first and second rods 7 and 8 in combination with a third rod 9 form a substantially triangular structure rigid in shape, the rod member 9 serving as a spreader disposed at the lowermost extremity of the second member and encouraging rod members 7 and 8 to remain in spaced-apart relationship at the lower terminus of the second member. Each looped end 13 on the topmost extremity of the second member is adapted to overlie each hooked extremity 5 at the bight portion 6 of the first member as shown in FIGS. 1 and 2.

In use and operation, the first member is firmly affixed to the hanger rod HR and the second member has one free end 13 looped over one of the hooks 5. The pipe is thereafter laid upon plural such second members within practical technical limits, and ultimately the remaining free end of each second portion is bent upwardly against the inherent resiliency of the stainless steel rod to loop over and engage the second hook 5. Thus, the pipe hanger is constrained by the spring tension inherent within the metal and biased the upwardly and inwardly curved hooked ends 5 so as to provide a reliable means of affixation of the pipe hanger second member to the first member. To remove same, the operation is substantially reversed, and it can be seen that no complicated mechanism or tools are required for rerouting any conduits or pipes using the system according to the instant application.

Having thus described the invention, it should be apparent that numerous structural modifications are contemplated as being a part of this invention as being set forth hereinabove and as defined hereinbelow by the claims.

What is claimed is:

1. A pipe hanger or the like to be attached to a depending hanger rod comprising in combination:

a first member having outwardly extending hooked ends and fixed to the hanger rod, a second member having a lower portion of arcuate shape and a top portion with means to removably attach to said hooked ends for rapid attachment to the hanger rod, said arcuate lower portion supporting a pipe thereon in which said top portion of said second member is provided with substantially linear portions, said second member formed out of a spring, resilient material in which said second member is provided with first and second free ends, on said top portion, one said free end adapted to be initially looped over one of said hooked ends of said first member, a pipe to be supported draped thereon, and a second free end looped over a second said hooked end of said first member wherein said first member is formed from first and second rods, welded together along portions thereof, a central area provided with an opening for slidable insertion upon the hanger rod in which said joined portions of said first member curve outwardly and downwardly in which said hooked ends taper upwardly and inwardly toward the hanging rod, and a bight portion is provided at a transition between said joint areas and said hooked ends in which said free ends of said second member define loops, said loops communicating with and formed by first and second rods tapering downwardly and outwardly, rigidly constrained and separated at a lowermost portion by means of a third rod therebetween.

2. The device of claim 1 in which said arcuate lower portion of said second member has a constant radius of curvature.

3. The device of claim 2 wherein said top portion of said second member tapers substantially inwardly.

4. The device of claim 3 in which said pipe hanger is formed of stainless steel.

* * * * *